(12) United States Patent
Duan et al.

(10) Patent No.: US 12,074,381 B2
(45) Date of Patent: Aug. 27, 2024

(54) ADJUSTMENT APPARATUS, MULTI-BAND ANTENNA, AND BASE STATION

(71) Applicant: Huawei Technologies Co., Ltd., Shenzhen (CN)

(72) Inventors: Fangqing Duan, Shenzhen (CN); Jianping Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 171 days.

(21) Appl. No.: 17/707,683

(22) Filed: Mar. 29, 2022

(65) Prior Publication Data

US 2022/0224007 A1 Jul. 14, 2022

Related U.S. Application Data

(63) Continuation of application No. PCT/CN2019/109150, filed on Sep. 29, 2019.

(51) Int. Cl.
*H01Q 3/32* (2006.01)
*F16H 19/04* (2006.01)
*H01P 1/18* (2006.01)

(52) U.S. Cl.
CPC .............. *H01Q 3/32* (2013.01); *F16H 19/043* (2013.01)

(58) Field of Classification Search
CPC ........ F16H 19/04; F16H 19/043; F16H 25/08; H01Q 1/12; H01Q 1/24; H01Q 1/246;
(Continued)

(56) References Cited

U.S. PATENT DOCUMENTS

| | | | | |
|---|---|---|---|---|
| 6,683,582 | B1 * | 1/2004 | Love | H01P 1/183 333/160 |
| 6,987,487 | B2 * | 1/2006 | Zimmerman | H01Q 21/08 342/368 |
| 8,217,848 | B2 * | 7/2012 | Girard | H01Q 1/246 343/765 |
| 10,374,291 | B2 | 8/2019 | Schmutzler | |
| 11,289,800 | B2 * | 3/2022 | Udagave | H01Q 21/26 |
| 11,374,316 | B2 * | 6/2022 | Xu | H01Q 3/2688 |

(Continued)

FOREIGN PATENT DOCUMENTS

| | | |
|---|---|---|
| CN | 103329345 A | 9/2013 |
| CN | 104170165 A | 11/2014 |

(Continued)

OTHER PUBLICATIONS

Yi et. al., "Design of Multi-band Remote Electrical Tilt Antenna Controller," Journal of Chongqing University of Posts and Telecommunications (Natural Science Edition), vol. 29, No. 03, Total 1 page (2017). With English abstract.

(Continued)

*Primary Examiner* — Tho G Phan
(74) *Attorney, Agent, or Firm* — Leydig, Voit & Mayer, Ltd.

(57) ABSTRACT

An adjustment apparatus is provided, which includes a drive unit; a plurality of adjustment rods correspondingly connected to a plurality of loads, the plurality of adjustment rods are classified into a first adjustment rod group and a second adjustment rod group; a selection unit, wherein the drive unit is configured to drive the selection unit to be connected to at least one adjustment rod in the first adjustment rod group or at least one adjustment rod in the second adjustment rod group; a shift unit, wherein the shift unit is configured to enable the selection unit to be switched between the first adjustment rod group and the second adjustment rod group; and an adjustment unit, wherein the drive unit is configured to drive the adjustment unit to drive the adjustment rod connected to the selection unit to move.

20 Claims, 10 Drawing Sheets

(58) Field of Classification Search
CPC .. H01Q 3/26; H01Q 3/32; H01Q 3/34; H01Q 3/36; H01Q 3/00; H01Q 21/06; H01Q 21/26; H01P 1/08; H01P 1/18
See application file for complete search history.

(56) References Cited

U.S. PATENT DOCUMENTS

| | | | | |
|---|---|---|---|---|
| 11,417,937 | B2* | 8/2022 | Li | H01Q 1/243 |
| 11,749,888 | B2* | 9/2023 | Wang | H01Q 1/246 343/893 |
| 11,909,095 | B2* | 2/2024 | Liu | F16H 1/225 |
| 2016/0211576 | A1 | 7/2016 | Vassilakis | |
| 2018/0026366 | A1 | 1/2018 | Xu et al. | |

FOREIGN PATENT DOCUMENTS

| | | |
|---|---|---|
| CN | 104852145 A | 8/2015 |
| CN | 105720370 A | 6/2016 |
| CN | 205350213 U | 6/2016 |
| CN | 105826684 A | 8/2016 |
| CN | 106505319 A | 3/2017 |
| CN | 206022623 U | 3/2017 |
| CN | 107425287 A | 12/2017 |
| CN | 208589544 U | 3/2019 |
| CN | 109768392 A | 5/2019 |
| CN | 109802237 A | 5/2019 |
| CN | 108432040 B | 1/2020 |
| EP | 3098904 B1 | 4/2018 |
| IN | 5689DELNP2010 B | 2/2012 |
| WO | 2017218608 A1 | 12/2017 |

OTHER PUBLICATIONS

Yu Junnan, "Research on Wideband Multi-band Multi-polarized Multi-radiation Pattern Stacked Microstrip Antenna," Anhui University, total 2 pages (Jul. 2019). With English abstract.

* cited by examiner ized to provide an adjustment apparatus that can adjust adjustment rods arranged along a first direction and an up-down direction, so as to fully and properly utilize available space inside the antenna while ensuring performance of the antenna. In this way, the entire antenna meets a miniaturization design requirement.

ADJUSTMENT APPARATUS, MULTI-BAND ANTENNA, AND BASE STATION

CROSS-REFERENCE TO RELATED APPLICATIONS

This application is a continuation of International Application No. PCT/CN2019/109150, filed on Sep. 29, 2019, the disclosure of which is hereby incorporated in its entirety.

TECHNICAL FIELD

Embodiments of this application relate to the field of communications device technologies, and in particular, to an adjustment apparatus, a multi-band antenna, and a base station.

BACKGROUND

Cell signal coverage in mobile communication is implemented by installing a base station antenna at a base station and making a beam cover a planning area. A radiation direction of the antenna beam of the base station needs to be adjusted based on changes of factors such as a cell geographic feature and user distribution. The adjustment of the radiation direction generally includes a beam downtilt angle in a vertical dimension and a beam azimuth angle in a horizontal dimension.

The adjustment of the beam downtilt angle and the beam azimuth angle is generally implemented by using two implementation solutions: One is to adjust a physical location of the entire base station antenna by using a mechanical apparatus, to adjust the radiation direction of the antenna beam. The other is that a physical location of the base station antenna remains unchanged, and a signal phase of each antenna unit inside the antenna is changed by adjusting a phase shifter inside the antenna, to change the radiation direction of the beam. The first solution is generally implemented by designing a rotatable apparatus on a mounting bracket of the base station antenna and designing an electrically controlled power output apparatus in the antenna, that is, a mechanical electrical tilt (MET). The second solution is generally implemented by designing, in the antenna, a phase shifter connected to each antenna unit and a controller that can control a phase of each output port of the phase shifter, that is, a remote electrical tilt (RET).

As quantities of mobile communications standards and bands increase, obtaining a site resource is increasingly difficult, and sharing a site (sharing a same site location by network operators) becomes a main requirement of an operator. In a co-site case, to avoid visual pollution caused by installing excessive antennas on different bands on the top of a tower of a base station, and increase a load-bearing burden of the tower of the base station, a multi-band antenna, that is, one antenna integrating a plurality of bands, has become an important trend of development of base station antennas. To enable the multi-band antenna to have the foregoing beam pointing adjustment function, the first adjustment solution based on the mechanical electrical tilt cannot meet different tilt function requirements. In the second adjustment solution based on the remote electrical tilt apparatus, a phase shifter and a corresponding MET or RET need to be installed on each band in the antenna.

An adjustment apparatus configured to adjust movement of a phase shifter shown in FIG. 1 includes a drive apparatus 01, a selection apparatus 02, a conversion apparatus 03, and an output apparatus 04. The drive apparatus 01 includes a first drive shaft 05 and a second drive shaft 06. The conversion apparatus 03 includes at least two followers. The output apparatus 04 includes at least two output parts, the output part is configured to be connected to the phase shifter, and the selection apparatus includes at least one selection part. The first drive shaft 05 is configured to control the selection part. The selection part is configured to trigger connection or disconnection between the follower and the output part under the drive of the first drive shaft 05. The second drive shaft 06 is configured to drive the follower, and when the follower is connected to the output part, the follower is configured to drive the output part to rotate under the drive of the second drive shaft 06, to drive the phase shifter to perform linear movement along an L direction, to change feed phases of different radiation oscillators of an antenna, so that a radiation beam direction of the antenna is tilted downward by a specific angle, thereby changing an electrical downtilt angle of the antenna.

As a quantity of bands of an antenna increases, a size of a whole machine of an antenna with 12 bands or more (for example, 20 bands) is limited by factors such as wind resistance, a tower bearing capability, an antenna erection size, and transportation. In addition, a user needs to miniaturize an antenna. All these factors limit the size of the whole machine of the antenna, and internal space of the antenna is increasingly compact, leaving less space for an adjustment apparatus configured to adjust a phase shifter. When the adjustment apparatus shown in FIG. 1 is used, a plurality of output parts connected to a plurality of phase shifters of a plurality of bands of an antenna are arranged along a direction P. If the bands of the antenna are extended to 12 or more or even to 20, a size of the antenna along the direction P is significantly increased, and therefore a size of a whole machine of the antenna along the direction P (which is generally a width size of the whole machine of the antenna) is significantly increased. Because the width size of the whole machine of the antenna is significantly increased, use performance of the antenna is affected by relatively large wind resistance, and the width size is not balanced with a size (a thickness size of the whole machine of the antenna) along a direction Q vertical to the direction P. To balance the sizes of the whole machine of the antenna along the direction P and the direction Q, and ensure use performance of the antenna, output parts connected to a plurality of phase shifters of bands of the antenna may be arranged along the direction P and the direction Q. In this way, a new adjustment apparatus needs to be designed.

SUMMARY

Embodiments of this application provide an adjustment apparatus, a multi-band antenna, and a base station, and are mainly intended to provide an adjustment apparatus that can adjust adjustment rods arranged along a first direction and an up-down direction, so as to fully and properly utilize available space inside the antenna while ensuring performance of the antenna. In this way, the entire antenna meets a miniaturization design requirement.

To achieve the foregoing objective, the following technical solutions are used in the embodiments of this application.

According to a first aspect, this application provides an adjustment apparatus, including:

a drive unit;

a plurality of adjustment rods, where the plurality of adjustment rods are configured to be correspondingly connected to a plurality of loads one by one, the plurality of adjustment rods are classified into a first adjustment rod group and a second adjustment rod group that are arranged along an up-down direction, the first adjustment rod group and the second adjustment rod group each include a plurality of adjustment rods that are arranged in parallel and at intervals along a first direction, and the first direction is perpendicular to the up-and-down direction;

a selection unit, where the selection unit is connected to the drive unit, and the drive unit is configured to drive the selection unit to be connected to at least one adjustment rod in the first adjustment rod group or at least one adjustment rod in the second adjustment rod group;

a shift unit, where the shift unit is configured to enable the selection unit to be switched between the first adjustment rod group and the second adjustment rod group; and an adjustment unit, where the adjustment unit is connected to the drive unit, and the drive unit is configured to drive the adjustment unit to drive the adjustment rod connected to the selection unit to move, to drive the corresponding load to move along a direction consistent with an axial direction of the adjustment rod.

According to the adjustment apparatus provided in the embodiments of this application, because the plurality of adjustment rods that are correspondingly connected to the plurality of loads one by one are classified into the first adjustment rod group and the second adjustment rod group that are arranged along the up-down direction, the first adjustment rod group and the second adjustment rod group each include the plurality of adjustment rods that are arranged in parallel and at intervals along the first direction, that is, the plurality of adjustment rods are arranged along the up-down direction and along the first direction perpendicular to the up-down direction. For example, when the load is a phase shifter in an antenna, the plurality of adjustment rods are classified into the first adjustment rod group and the second adjustment rod group along the up-down direction. Compared with arranging all the adjustment rods along the first direction, a size of the entire antenna along the first direction can be effectively reduced, thereby avoiding a phenomenon that performance of the antenna is greatly affected due to a relatively large wind resistance caused by a relatively large size of the antenna along the first direction, and ensuring a balance between a size of the antenna along the first direction and a size of the antenna along the up-down direction. Because the first adjustment rod group and the second adjustment rod group are disposed along the up-down direction, the shift unit may be used to enable the selection unit to be switched between the first adjustment rod group and the second adjustment rod group, so as to ensure that the selection unit can select all the adjustment rods, thereby ensuring that phase adjustment can be performed on all the phase shifters.

In a possible implementation of the first aspect, the selection unit includes a moving frame, where the moving frame is slidably disposed on a support rod, the drive unit is connected to the moving frame by using a first transmission unit, to drive the moving frame to slide along the support rod, and a sliding direction of the moving frame is parallel to the first direction; a shift shaft that can move synchronously with the moving frame is disposed on the moving frame, an axial direction of the shift shaft is consistent with the axial direction of the adjustment rod, the shift shaft is located between the first adjustment rod group and the second adjustment rod group, a shift wheel is disposed on the shift shaft, a driven wheel matched with the shift wheel is disposed on the adjustment rod, the driven wheel is disposed on a limit frame, the limit frame is configured to prevent the driven wheel from moving along the axial direction of the adjustment rod, the shift shaft is connected to the adjustment unit that can drive the shift shaft to rotate, and the shift shaft can be switched between the first adjustment rod group and the second adjustment rod group by using the shift unit; and the adjustment rod is threadedly connected to the driven wheel; or the adjustment rod is fixedly connected to the driven wheel, the adjustment rod is connected to the corresponding load by using a conversion structure, and the conversion structure is configured to convert rotational movement of the adjustment rod into movement of the load along a direction consistent with the axial direction of the adjustment rod. The selection unit uses the moving frame moving along the first direction, to drive the shift wheel to move along the first direction, so as to implement connection to a driven wheel at an unused location, and drive movement of a load at an unused location. The selection unit has a simple structure, and is easy to implement. The adjustment rod may be threadedly or fixedly connected to the driven wheel. When the adjustment rod is fixedly connected to the driven wheel, the conversion structure is used to convert the rotational movement of the adjustment rod into the movement of the load along the direction consistent with the axial direction of the adjustment rod.

In a possible implementation of the first aspect, the conversion structure includes: a first bevel gear, where the first bevel gear is disposed on the adjustment rod; and a second bevel gear, where the second bevel gear is meshed with the first bevel gear, the second bevel gear is connected to a spur gear by using a connecting shaft, a rack matched with the spur gear is disposed on the load, and an extension direction of the rack is consistent with the axial direction of the adjustment rod. When the adjustment rod is fixedly connected to the driven wheel, the rotating driven wheel drives the adjustment rod to rotate synchronously. By using the conversion structure of the structure, that is, the rotating driven wheel drives the adjustment rod to rotate, the rotating adjustment rod drives the second bevel gear to rotate by using the first bevel gear, the second bevel gear drives the spur gear to rotate by using the connecting shaft, and further drives the adjustment rod to move along the axial direction of the adjustment rod by using the rack matched with the spur gear.

In a possible implementation of the first aspect, the drive unit includes a first drive shaft, the first transmission unit includes transmission teeth disposed on the first drive shaft, meshing teeth matched with the transmission teeth are disposed on the moving frame, and an arrangement direction of the meshing teeth is parallel to the first direction. By using the transmission teeth disposed on the first drive shaft and the meshing teeth disposed on the moving frame, rotational movement of the first drive shaft is converted into linear movement of the moving frame, the shift shaft, and the shift wheel along the first direction. In addition, the first transmission unit has a simple structure and stable transmission.

In a possible implementation of the first aspect, the limit frame includes a first limit plate and a second limit plate that are disposed oppositely, the driven wheel is disposed between the first limit plate and the second limit plate, and the adjustment rod sequentially passes through the first limit plate, the driven wheel, and the second limit plate along an axial direction of the driven wheel. The driven wheel is disposed between the first limit plate and the second limit plate that are opposite, so as to prevent the driven wheel from moving along the axial direction of the adjustment rod, thereby ensuring movement of the adjustment rod. The first limit plate and the second limit plate that are arranged oppositely are used, so that the entire structure is more compact.

In a possible implementation of the first aspect, the support rod includes a first support rod and a second support rod that are disposed oppositely, and correspondingly, both ends of the shift shaft are slidably disposed on the first support rod and the second support rod. Using the first support rod and the second support rod that are arranged oppositely can ensure stability of the moving frame and sliding of the shift shaft.

In a possible implementation of the first aspect, the adjustment unit includes a transmission shaft, where an axial direction of the transmission shaft is parallel to the first direction, the drive unit is connected to the transmission shaft by using a second transmission unit, to drive the transmission shaft to rotate, the transmission shaft is connected to the shift shaft by using a linkage structure, and the linkage structure is configured to enable the transmission shaft to drive the shift shaft to rotate synchronously. The adjustment apparatus provided in the embodiments of this application is not provided with an independent transmission unit to drive the driven wheel to rotate, but directly uses the linkage structure to drive the rotating transmission shaft to drive the shift shaft to move. In this way, a structure of the entire adjustment apparatus is effectively simplified, a quantity of components is reduced, and space occupied by the adjustment apparatus is reduced.

In a possible implementation of the first aspect, the linkage structure includes: a primary bevel gear, where the primary bevel gear is disposed on the transmission shaft; and a secondary bevel gear, where the secondary bevel gear is disposed on the shift shaft and meshed with the primary bevel gear, the primary bevel gear is connected to the shift shaft by using a connecting part, and when the shift shaft moves along the first direction, the primary bevel gear can be driven to move along the transmission shaft by using the connecting part. The primary bevel gear disposed on the transmission shaft and the secondary bevel gear disposed on the shift shaft and matched with the primary bevel gear are used to drive the shift shaft to rotate, to drive the shift wheel to rotate, thereby driving the driven wheel to rotate. A structure is simple.

In a possible implementation of the first aspect, the connecting part includes a first connecting plate slidably disposed on the transmission shaft, a second connecting plate connected to the first connecting plate is disposed on the shift shaft, the primary bevel gear is rotatably connected to the first connecting plate, and the secondary bevel gear is rotatably connected to the second connecting plate. By using the first connecting plate and the second connecting plate that are connected, the shift shaft slides to any location, and the primary bevel gear can slide along the transmission shaft, so as to ensure meshing with the secondary bevel gear, thereby ensuring that the rotating transmission shaft drives the shift shaft to rotate. In addition, a structure of the connecting part is relatively simple.

In a possible implementation of the first aspect, the drive unit includes a second drive shaft, and the second transmission unit includes a turbine disposed on the transmission shaft and a worm disposed on the second drive shaft and matched with the turbine. The second transmission unit is obtained through meshing of the turbine and the worm, to drive the transmission shaft to rotate. In addition, a structure of the second transmission unit is simple.

In a possible implementation of the first aspect, the moving frame is slidably disposed between adjustment rods at both ends of the first adjustment rod group or slidably disposed between adjustment rods at both ends of the second adjustment rod group, the shift shaft includes a first shift shaft and a second shift shaft that are disposed at both ends of the moving frame, the shift wheel includes a first shift wheel disposed on the first shift shaft and a second shift wheel disposed on the second shift shaft, and in a process in which the moving frame moves along the first direction, when one of the first shift wheel and the second shift wheel is meshed with a corresponding driven wheel, the other is located between two corresponding driven wheels. The shift wheel includes a first shift wheel and a second shift wheel. Therefore, when the first shift wheel is meshed with the driven wheel, the second shift wheel is not meshed with the driven wheel, and when the first shift wheel is not meshed with the driven wheel, the second shift wheel is meshed with the driven wheel. Because it is ensured that the shift wheel can be meshed with any one of the driven wheels, a length size of the moving frame along the first direction can be reduced, and further space occupied by the moving frame can be reduced.

In a possible implementation of the first aspect, the shift unit includes a first shift conversion box and a second shift conversion box that are disposed oppositely, where the first shift conversion box and the second shift conversion box are disposed oppositely at both ends of the first adjustment rod group and both ends of the second adjustment rod group, a bracket is movably disposed between the first shift conversion box and the second shift conversion box, the shift wheel is disposed on the bracket, the shift shaft passes through the bracket and can slide along an extension direction of the bracket synchronously with the shift wheel, a first abutment surface and a second abutment surface that abut the shift wheel are formed at both ends of the bracket, the first abutment surface is close to the first shift conversion box, the second abutment surface is close to the second shift conversion box, and an up slide is disposed on the first shift conversion box, and a down slide is disposed on the second shift conversion box; and when the shift wheel abuts the first abutment surface, the moving shift shaft and the shift wheel drive the bracket to move along the up slide, so that the shift wheel and the bracket move to the first adjustment rod group, and when the shift wheel abuts the second abutment surface, the moving shift shaft and the shift wheel drive the bracket to move along the down slide, so that the shift wheel and the bracket move to the second adjustment rod group. By using the up slide disposed on the first shift conversion box and the down slide disposed on the second shift conversion box, it is ensured that the shift wheel can be switched between the first adjustment rod group and the second adjustment rod group, so that the shift wheel can be selectively connected to all driven wheels. In addition, the shift unit has a simple structure, and is easy to manufacture.

In a possible implementation of the first aspect, the moving frame is disposed on a side of the first adjustment rod group and the second adjustment rod group that are arranged along an up-down direction, the first adjustment rod group is closer to the moving frame relative to the second adjustment rod group, both the up slide and the down slide are inclined slides, one end of the inclined slide faces the first adjustment rod group and the other end faces the second adjustment rod group, and the shift wheel and the bracket are slidably disposed on the shift shaft. The first adjustment rod group and the second adjustment rod group are not disposed oppositely along an up-down direction, so that a size of the entire adjustment apparatus along an up-down direction can be reduced.

In a possible implementation of the first aspect, the shift shaft is connected to the shift wheel by using a spline structure, an external spline is disposed on the shift shaft, and an internal spline matched with the outer spline is disposed on the shift wheel. The first adjustment rod group and the second adjustment rod group are not disposed oppositely along the up-down direction. Therefore, when the shift wheel is switched between the first adjustment rod group and the second adjustment rod group, the shift shaft is connected to the shift wheel by using the spline, so that the shift wheel can move along the shift shaft during switching, thereby ensuring that the switched shift wheel can be matched with a corresponding driven wheel of the first adjustment rod group or the second adjustment rod group.

In a possible implementation of the first aspect, first support grooves for supporting the bracket are oppositely disposed on the first shift conversion box and the second shift conversion box, and the up slide communicates with the first support groove of the first shift conversion box; and second support grooves for supporting the bracket are oppositely disposed on the first shift conversion box and the second shift conversion box, and the down slide communicates with the second support groove of the second gear shift conversion box. The first support groove and the second support groove are used as support structures of the bracket. The bracket has a simple structure, and is easy to implement.

In a possible implementation of the first aspect, the drive unit is disposed above or below the moving frame, the drive unit has a first output shaft, a second output shaft, a first drive shaft arranged up and down with the first output shaft, and a second drive shaft arranged up and down with the second output shaft, the first drive shaft is connected to the selection unit, the second drive shaft is connected to the adjustment unit, a first driving wheel is disposed on the first output shaft, a first driven wheel meshed with the first driving wheel is disposed on the first drive shaft, a second driving wheel is disposed on the second output shaft, and a second driven wheel meshed with the second driving wheel is disposed on the second drive shaft. The drive unit is disposed above or below the moving frame. Therefore, compared with disposing the drive unit on a side of the moving frame, a size occupied by the entire adjustment apparatus along a direction consistent with the axial direction of the adjustment rod is reduced, and a size above or below the moving frame is fully utilized, so that a layout of the entire adjustment apparatus is proper.

According to a second aspect, this application further provides a multi-band antenna, including:
an antenna array, where the antenna array is configured to radiate an electromagnetic wave in a plurality of bands;
a phase shifter, where the phase shifter is connected to the antenna array, and is configured to adjust a phase of the electromagnetic wave of the antenna array, and there are a plurality of phase shifters; and
the adjustment apparatus in the possible implementations of the first aspect, where the plurality of adjustment rods of the adjustment apparatus are correspondingly connected to the plurality of phase shifters one by one.

According to the multi-band antenna provided in the embodiments of this application, the multi-band antenna includes the adjustment apparatus described in any one of the foregoing technical solutions. Therefore, because the plurality of adjustment rods that are in the adjustment apparatus and that are correspondingly connected to the plurality of phase shifters are classified into the first adjustment rod group and the second adjustment rod group that are disposed along the up-down direction, a size of the entire antenna along the first direction can be effectively reduced, thereby avoiding a phenomenon that the antenna is greatly affected due to a relatively large wind resistance caused by a relatively large size of the antenna along the first direction, and ensuring a balance between a size of the antenna along the first direction and a size of the antenna along the up-down direction. Because the first adjustment rod group and the second adjustment rod group are arranged along the up-down direction, the shift unit may be used to enable the selection unit to be switched between the first adjustment rod group and the second adjustment rod group, so as to ensure that the selection unit can select all the adjustment rods, thereby ensuring that phase adjustment can be performed on all the phase shifters.

According to a third aspect, this application further provides a base station, including:
a transceiver, and the multi-band antenna in the possible implementations of the second aspect, where
the transceiver is configured to receive and transmit a signal transmitted by the multi-band antenna.

According to the base station provided in the embodiments of this application, because the base station uses the multi-band antenna described in the implementations of the second aspect, the base station provided in the embodiments of this application can resolve a same technical problem as the multi-band antenna described in the foregoing technical solution, and achieve a same expected effect.

DESCRIPTION OF EMBODIMENTS

Embodiments of this application relate to an adjustment apparatus, a multi-band antenna, and a base station. The following describes the adjustment apparatus, the multi-band antenna, and the base station in detail with reference to accompanying drawings.

Figure 1:
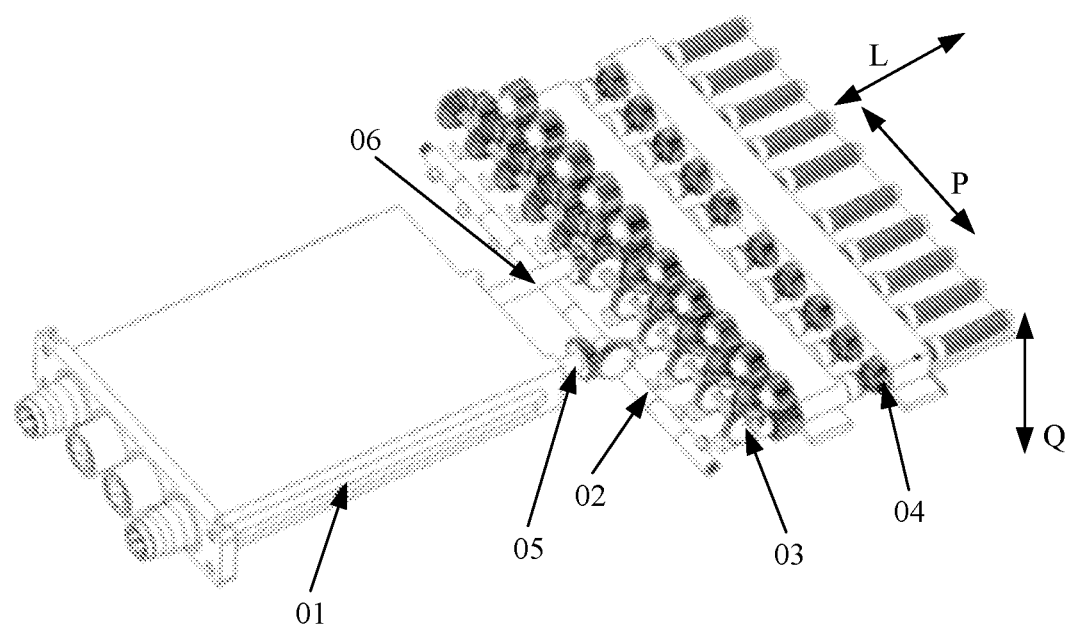
FIG. 1 is a schematic diagram of a structure of an adjustment apparatus in the conventional technology.
Figure 2:
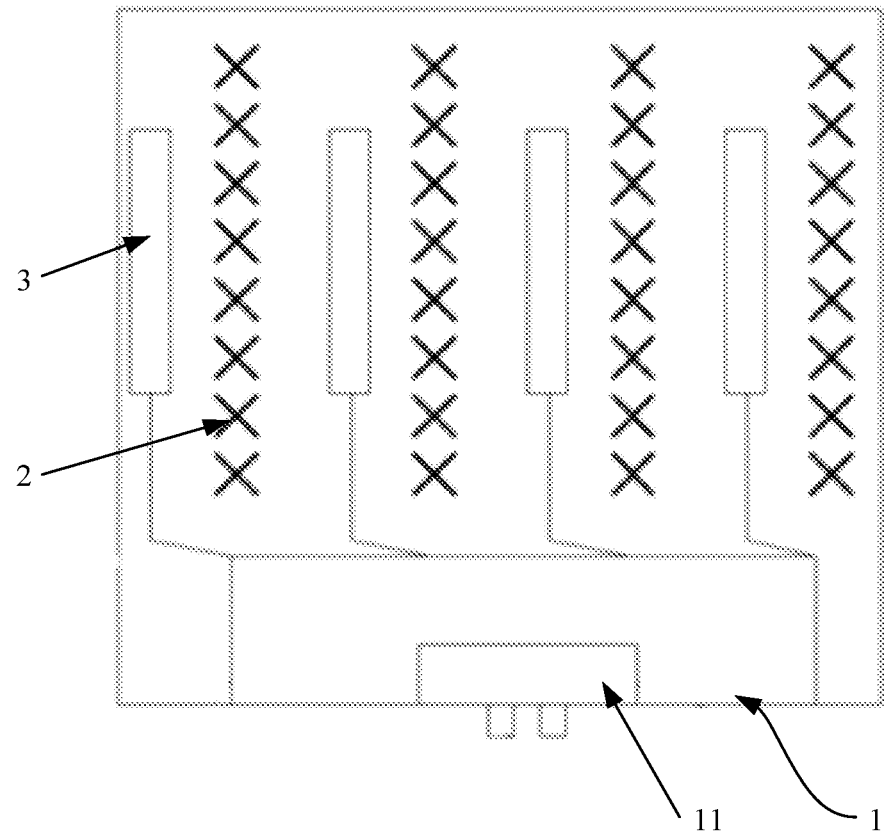
FIG. 2 is a schematic diagram of a structure of a multi-band antenna according to an embodiment of this application.
Figure 3:
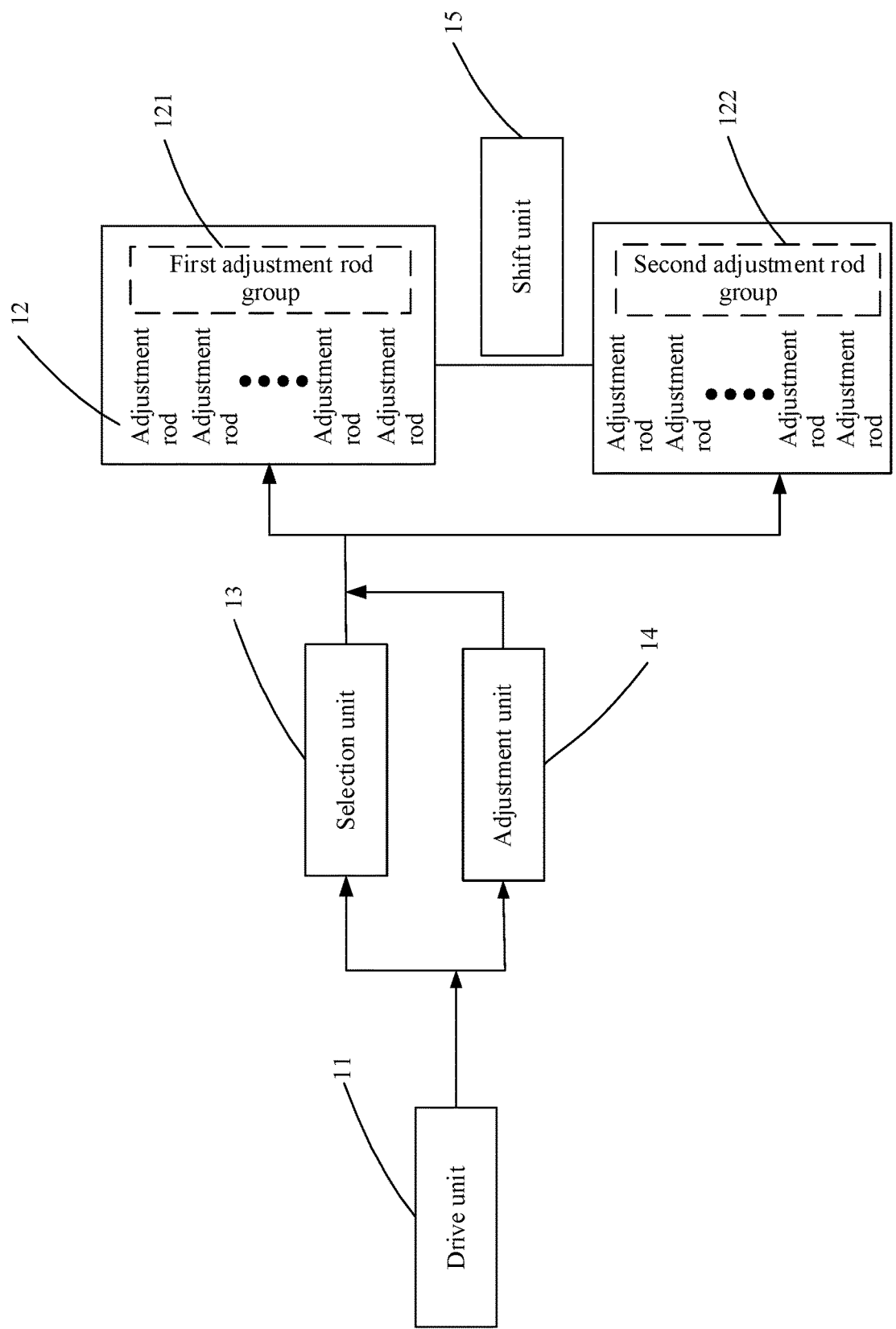
FIG. 3 is a block diagram of a structure of an adjustment apparatus according to an embodiment of this application.
Figure 4:
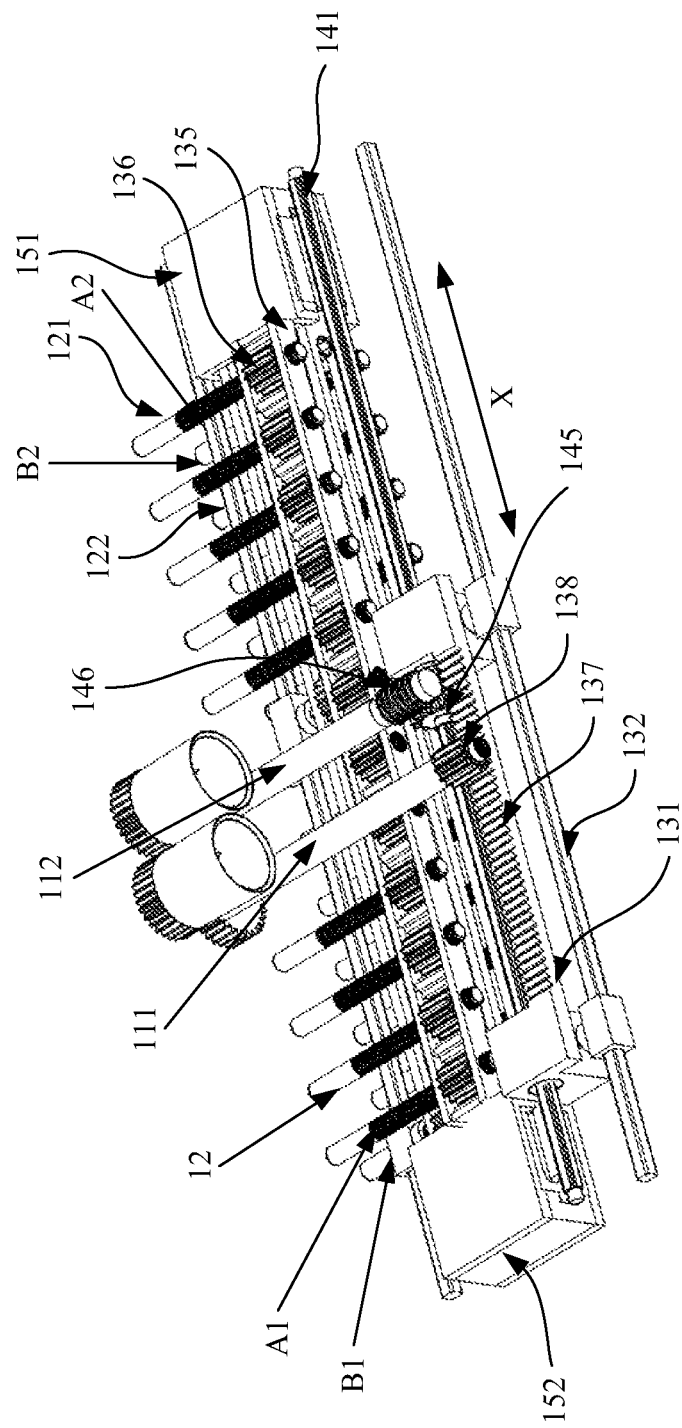
FIG. 4 is a perspective view of an adjustment apparatus according to an embodiment of this application.

According to one aspect, an embodiment of this application provides an adjustment apparatus. As shown in FIG. 2 and FIG. 3, an adjustment apparatus 1 includes a drive unit 11, a plurality of adjustment rods 12, a selection unit 13, an adjustment unit 14, and a shift unit 15. The plurality of adjustment rods 12 are configured to be correspondingly connected to a plurality of loads one by one, the plurality of adjustment rods 12 are classified into a first adjustment rod group 121 and a second adjustment rod group 122 that are arranged along an up-down direction. As shown in FIG. 4, the first adjustment rod group 121 and the second adjustment rod group 122 each include a plurality of adjustment rods 12 that are arranged in parallel and at intervals along a first direction X, and the first direction X is perpendicular to the up-down direction. The selection unit 13 is connected to the drive unit 11, and the drive unit 11 is configured to drive the selection unit 13 to be connected to at least one adjustment rod 12 in the first adjustment rod group 121 or at least one adjustment rod 12 in the second adjustment rod group 122. The shift unit 15 is configured to enable the selection unit 13 to be switched between the first adjustment rod group 121 and the second adjustment rod group 122. The adjustment unit 14 is connected to the drive unit 11, and the drive unit 11 is configured to drive the adjustment unit 14 to drive the adjustment rod 12 connected to the selection unit 13 to move, to drive the corresponding load to move along a direction consistent with an axial direction of the adjustment rod 12.

It should be noted that, that the plurality of adjustment rods 12 are configured to be correspondingly connected to a plurality of loads one by one indicates that one adjustment rod 12 is configured to be connected to one load.

That is, the plurality of adjustment rods 12 are classified into the first adjustment rod group 121 and the second adjustment rod group 122 that are arranged along the up-down direction, and the first adjustment rod group 121 and the second adjustment rod group 122 each include the plurality of adjustment rods 12 that are arranged along the first direction X. In this way, the plurality of adjustment rods 12 are arranged along the first direction X and arranged along the up-down direction. Compared with the conventional technology in which not all adjustment rods 12 are disposed along the first direction, sizes occupied along the first direction when all the adjustment rods 12 are disposed along the first direction can be reduced. For example, when the load is a phase shifter, the adjustment apparatus in this application reduces a size of the entire antenna along the first direction, so as to avoid a phenomenon of a relatively large wind resistance caused by a relatively large size along the first direction. In addition, the adjustment rods are arranged along the up-down direction, so as to ensure a balance between a size of the antenna along the first direction and a size of the antenna along the up-down direction. In this way, a layout of the antenna is proper.

Because the adjustment rods 12 are classified into the first adjustment rod group 121 and the second adjustment rod group 122 that are disposed along the up-down direction, the shift unit 15 may be used to enable the selection unit 13 to be switched between the first adjustment rod group 121 and the second adjustment rod group 122, so as to ensure that the selection unit 13 can be selectively connected to the adjustment rods in the first adjustment rod group 121 and the adjustment rods in the second adjustment rod group 122, thereby implementing selective connection to all the adjustment rods 12, and finally ensuring adjustment of all the loads.

Figure 5:
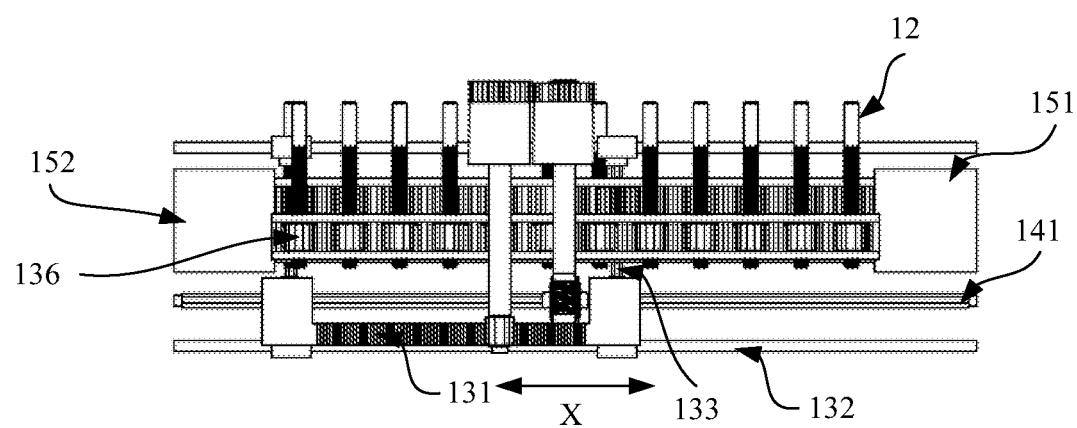
FIG. 5 is a top view of an adjustment apparatus according to an embodiment of this application.
Figure 6:
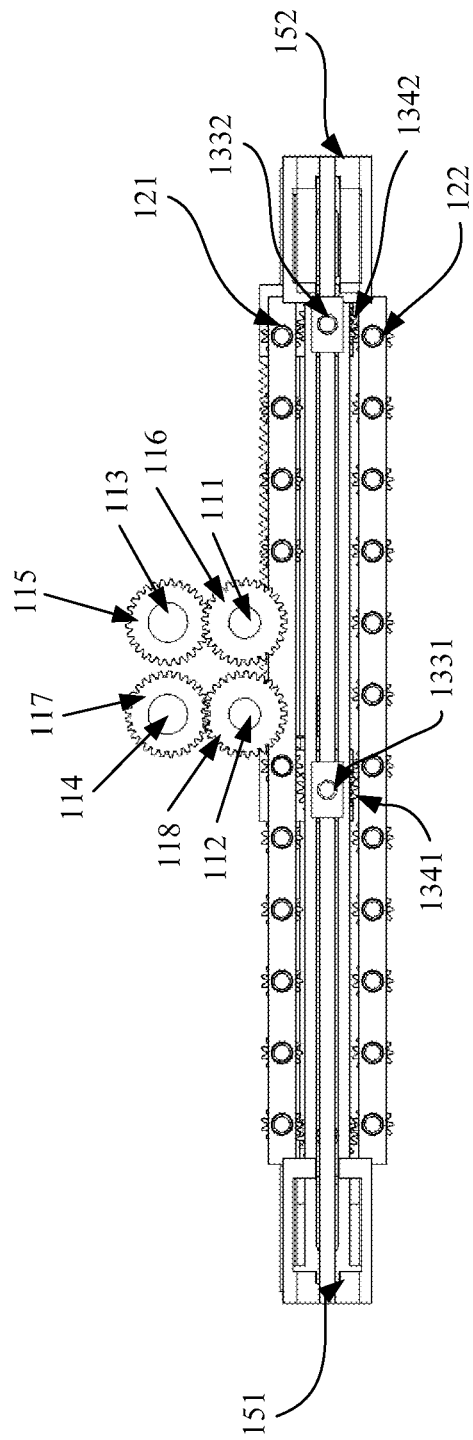
FIG. 6 is a side view of an adjustment apparatus according to an embodiment of this application.
Figure 10:
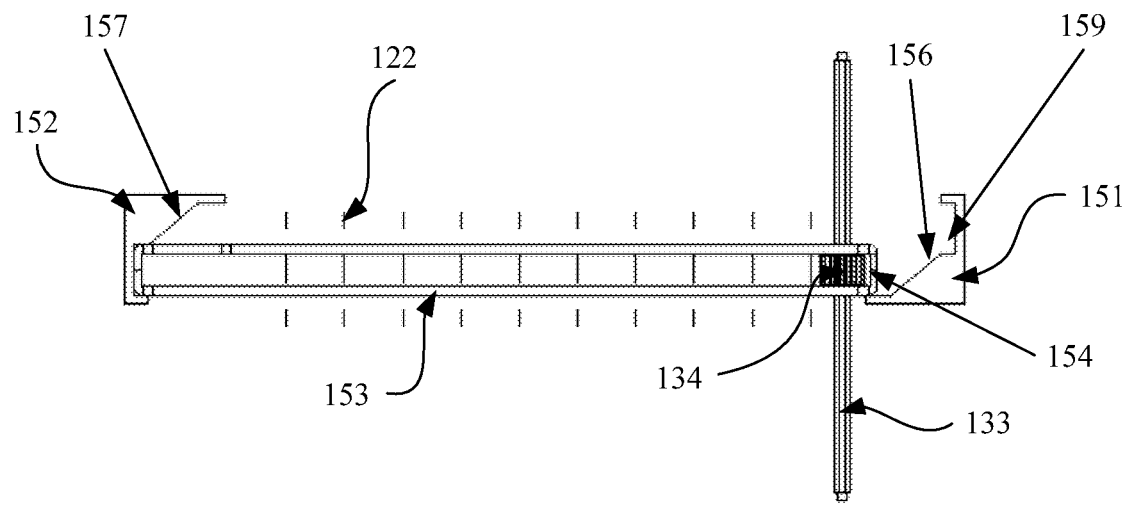
FIG. 10 is a schematic diagram of a connection relationship between a first shift conversion box, a second shift conversion box, a bracket, a shift shaft, and a shift wheel according to an embodiment of this application.

In some implementations, as shown in FIG. 4, the selection unit 13 includes a moving frame 131, where the moving frame 131 is slidably disposed on a support rod 132, the drive unit 11 is connected to the moving frame 131 by using a first transmission unit, to drive the moving frame 131 to slide along the support rod 132, and a sliding direction of the moving frame 131 is parallel to the first direction X. As shown in FIG. 5 and FIG. 6, a shift shaft 133 that can move synchronously with the moving frame 131 is disposed on the moving frame 131, an axial direction of the shift shaft 133 is consistent with the axial direction of the adjustment rod 12, the shift shaft 133 is located between the first adjustment rod group 121 and the second adjustment rod group 122, a shift wheel 134 (as shown in FIG. 10) is disposed on the shift shaft 133, and a driven wheel 136 matched with the shift wheel 134 is disposed on the adjustment rod 12. As shown in FIG. 4, the driven wheel 136 is disposed on a limit frame 135, the limit frame 135 is configured to prevent the driven wheel 136 from moving along the axial direction of the adjustment rod 12, the shift shaft 133 is connected to the adjustment unit 14 that can drive the shift shaft 133 to rotate, and the shift shaft 134 can be switched between the first adjustment rod group 121 and the second adjustment rod group 122 by using the shift unit 15.

A working principle of the selection unit 13 is as follows: The drive unit 11 drives the moving frame 131 to move along the first direction X by using the first transmission unit, and the moving frame 131 that is moving drives the shift shaft 133 and the shift wheel 134 to also move along the first direction X. When the moving frame 131 moves to an adjustment rod 12 that needs to be selected from the first adjustment rod group 121 or the second adjustment rod group 122, the drive unit 11 drives the moving frame 131 to stop moving by using the first transmission unit, so that the shift wheel 134 is meshed with the selected driven wheel 136. When switching between the first adjustment rod group 121 and the second adjustment rod group 122 needs to be performed, the shift wheel 134 may be switched between the first adjustment rod group 121 and the second adjustment rod group 122 by using the shift unit 15, so that the shift wheel 134 moves to the first adjustment rod group 121 or the second adjustment rod group 122.

Figure 12:
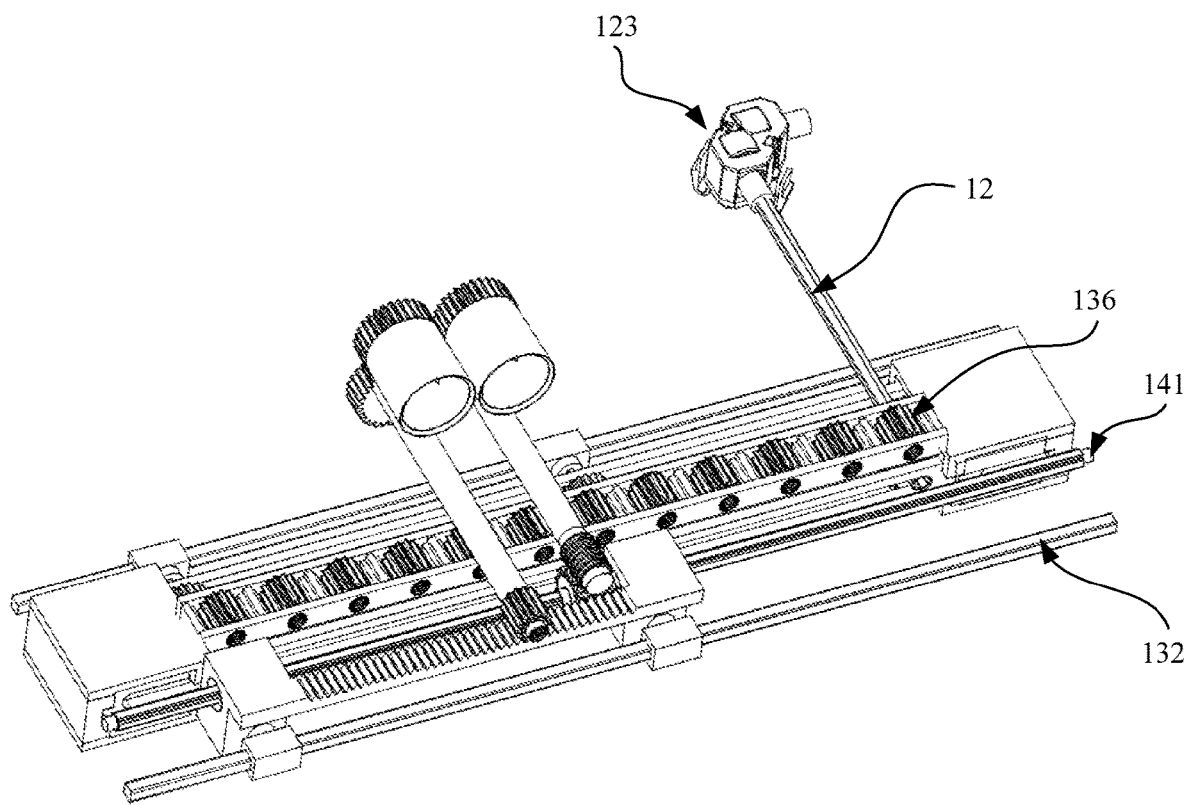
FIG. 12 is a schematic diagram of a structure of an adjustment apparatus according to an embodiment of this application.

There are a plurality of cases of a connection structure between the driven wheel 136 and the adjustment rod 12. For example, as shown in FIG. 4, the adjustment rod 12 is threadedly connected to the driven wheel 136, that is, the driven wheel 136 and the adjustment rod 12 are screwed. When the driven wheel 136 rotates around a rotation axis of the driven wheel 136, the adjustment rod 12 moves linearly along an axis of the adjustment rod 12, to drive the load to move along a direction consistent with the axial direction of the adjustment rod 12. As shown in FIG. 12, for another example, the adjustment rod 12 is fixedly connected to the driven wheel 136. To enable the load to move along a direction consistent with the axial direction of the adjustment rod 12, the adjustment rod 12 is connected to the corresponding load by using a conversion structure 123, and the conversion structure 123 is configured to convert rotational movement of the adjustment rod 12 into movement of the load along the direction consistent with the axial direction of the adjustment rod 12. Compared with a structure shown in FIG. 12, in the structure shown in FIG. 4, the driven wheel 136 is threadedly connected to the adjustment rod 12, a structure is simple, and a quantity of parts is small, thereby effectively simplifying a structure of the entire adjustment apparatus, and further reducing space occupied by the entire adjustment apparatus. Certainly, that the adjustment rod 12 is connected to the driven wheel 136 in another connection structure is also within the protection scope of this application.

Figure 13:
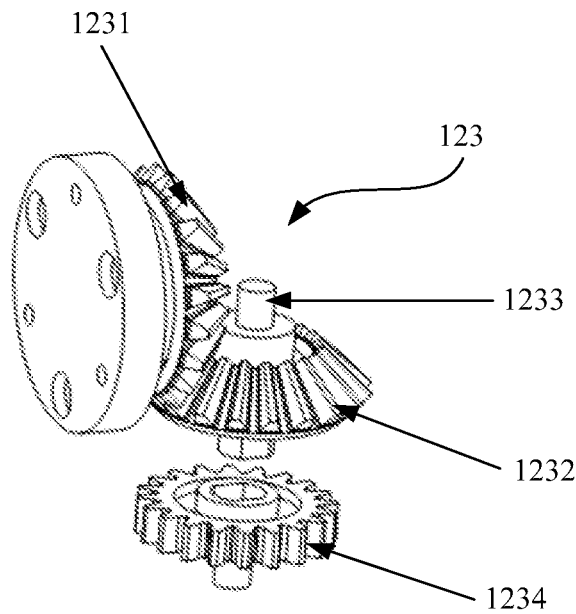
FIG. 13 is a schematic diagram of a structure of a conversion structure according to an embodiment of this application.

In some implementations, as shown in FIG. 13, the conversion structure 123 includes a first bevel gear 1231, a second bevel gear 1232, a connecting shaft 1233, and a spur gear 1234, and the first bevel gear 1231 is disposed on the adjustment rod 12. The second bevel gear 1232 is meshed with the first bevel gear 1231, the second bevel gear 1232 is connected to the spur gear 1234 by using the connecting shaft 1233, a rack matched with the spur gear 1234 is disposed on the load, and an extension direction of the rack is consistent with the axial direction of the adjustment rod. A working principle of the conversion structure 123 is as follows: When the first bevel gear 1231 rotates synchronously with the adjustment rod 12, the second bevel gear 1232 rotates around a rotation axis of the second bevel gear 1232, and then the spur gear 1234 rotates by using the connecting shaft 1233. The rotating spur gear 1233 is meshed with the rack on the load, to drive the load to move linearly along a direction consistent with the axial direction of the adjustment rod 12. Certainly, the conversion structure 123 may also be of another structure, and a conversion structure 123 of any structure falls within the protection scope of this application.

Figure 9:
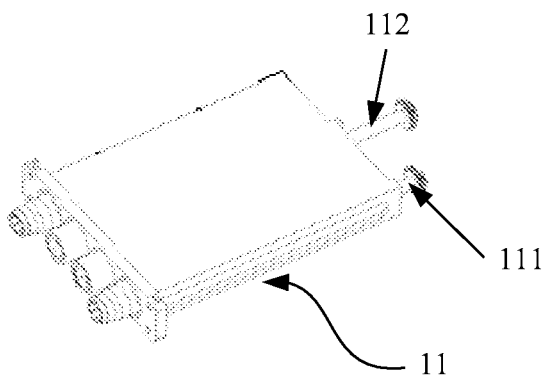
FIG. 9 is a schematic diagram of a structure of a drive unit according to an embodiment of this application.

To further simplify the structure of the entire adjustment apparatus, a drive unit for driving the selection unit 13 and a drive unit for driving the adjustment unit 14 are a same drive unit. As shown in FIG. 9, the drive unit 11 includes a first drive shaft 111 and a second drive shaft 112. The first drive shaft 111 is connected to the selection unit 13, and the second drive shaft 112 is connected to adjustment unit 14. That is, the first drive shaft 111 first drives the selection unit 13, so that the shift wheel is meshed with a driven wheel 136 that needs to be selected. Then, the second drive shaft 112 drives the adjustment unit 14, so that the shift wheel 134 drives the selected driven wheel 136 to rotate, thereby driving the load to move.

In some implementations, as shown in FIG. 4, the first transmission unit includes transmission teeth 138 disposed on the first drive shaft 111, meshing teeth 137 matched with the transmission teeth 138 are disposed on the moving frame 131, and an arrangement direction of the meshing teeth 137 is parallel to the first direction X, that is, rotational movement of the first drive shaft 111 is converted into linear movement of the moving frame 131, and a structure of the first transmission unit is simple and easy to implement.

To make the structure of the entire adjustment apparatus compact, as shown in FIG. 4 and FIG. 5, the limit frame 135 for preventing the driven wheel 136 from moving along the axial direction of the adjustment rod 12 in embodiments of this application includes a first limit plate and a second limit plate that are disposed oppositely, the driven wheel 136 is disposed between the first limit plate and the second limit plate, and the adjustment rod 12 sequentially passes through the first limit plate, the driven wheel 136, and the second limit plate along an axial direction of the driven wheel 136. The first adjustment rod group 121 includes a plurality of adjustment rods, and correspondingly, there are a plurality of driven wheels 136. Similarly, the second adjustment rod group 122 includes a plurality of adjustment rods, and correspondingly, there are a plurality of driven wheels 136. Therefore, to simplify the structure, there is one first limit plate and one second limit plate that are used to limit the plurality of driven wheels 136 in the first adjustment rod group 121, and similarly, there is one first limit plate and one second limit plate that are used to limit the plurality of driven wheels 136 in the second adjustment rod group 122. This simplifies the structure and facilitates installation.

Figure 7:
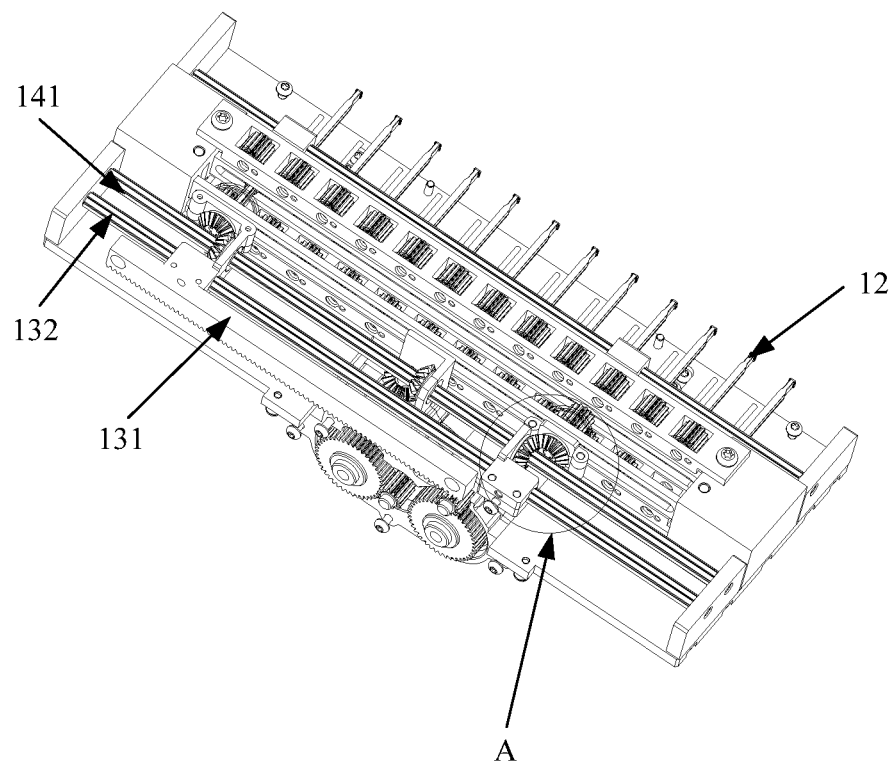
FIG. 7 is a bottom view of an adjustment apparatus according to an embodiment of this application.
Figure 8:
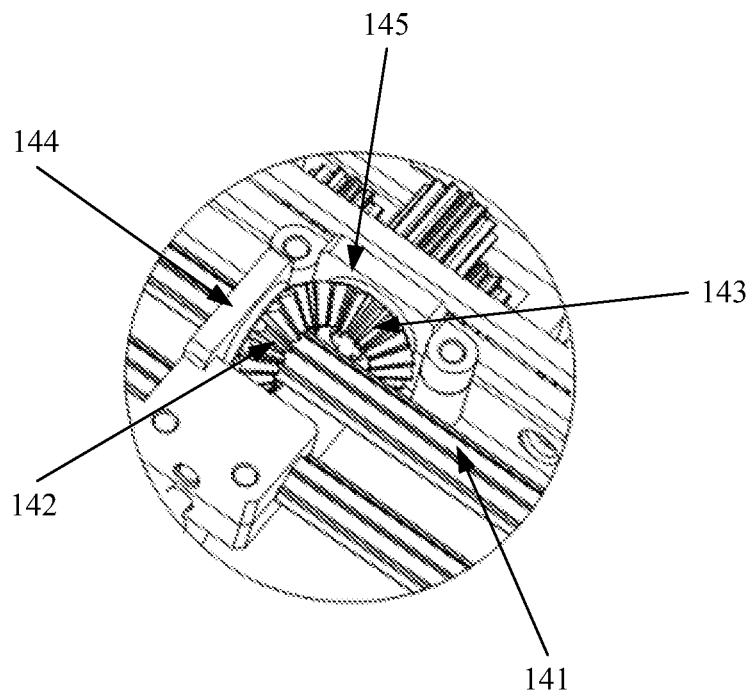
FIG. 8 is an enlarged view of a part A in FIG. 7.

In some implementations, as shown in FIG. 4, the adjustment unit 14 includes a transmission shaft 141. An axial direction of the transmission shaft 141 is parallel to the first direction X, the drive unit 11 is connected to the transmission shaft 141 by using a second transmission unit, to drive the transmission shaft 141 to rotate, the transmission shaft 141 is connected to the shift shaft 133 by using a linkage structure, and the linkage structure is configured to enable the transmission shaft 141 to drive the shift shaft to rotate synchronously. As shown in FIG. 7 and FIG. 8, for example, the linkage structure includes a primary bevel gear 142 and a secondary bevel gear 143. The primary bevel gear 142 is disposed on the transmission shaft 141, and can rotate synchronously with the transmission shaft 141. The secondary bevel gear 143 is disposed on the shift shaft 133 and meshed with the primary bevel gear 142, the primary bevel gear 142 is connected to the shift shaft 133 by using a connecting part, and when the shift shaft 133 moves along the first direction X, the primary bevel gear 142 can be driven to move along the transmission shaft 141 by using the connecting part. For another example, the linkage structure includes a worm disposed on the transmission shaft and a turbine disposed on the shift shaft and matched with the worm. Certainly, the linkage structure may also be another structure.

A working principle of the adjustment unit 14 is as follows: The drive unit 11 drives the transmission shaft 141 to rotate around a rotation axis of the transmission shaft 141 by using the second transmission unit, and the rotating transmission shaft 141 drives the primary bevel gear 142 to rotate, to drive the secondary bevel gear 143 to rotate. The rotating secondary bevel gear 143 drives the shift shaft 133 to rotate, to finally drive the driven wheel 136 meshed with the shift wheel 134 to rotate.

The adjustment unit 14 provided in embodiments of this application drives the shift shaft 133 to rotate by using the linkage structure, to drive the shift wheel 134 to rotate, and further drive the driven wheel 136 to rotate. In this way, it is advantageous that the transmission unit that directly drives the driven wheel 136 is not used, but the shift shaft 133 is driven to rotate by using the linkage structure, so that a quantity of parts can be reduced, a structure can be simplified, and space occupied by the entire adjustment apparatus can be reduced.

When the primary bevel gear disposed on the transmission shaft 141 rotates with the transmission shaft 141, the primary bevel gear also needs to move with the shift shaft 134 along the first direction. For example, the primary bevel gear is connected to the transmission shaft by using a spline, that is, an external spline is disposed on the transmission shaft, and an internal spline is disposed on the primary bevel gear.

In some implementations, as shown in FIG. 8, the connecting part includes a first connecting plate 144 slidably disposed on the transmission shaft 141, a second connecting plate 145 connected to the first connecting plate 144 is disposed on the shift shaft 133, the primary bevel gear 142 is rotatably connected to the first connecting plate 144, and the secondary bevel gear 143 is rotatably connected to the second connecting plate 145. The connecting part may also be of another structure. A specific structure of the connecting part is not limited herein, and any structure falls within the protection scope of this application.

As shown in FIG. 4, the second transmission unit includes a turbine 145 disposed on the transmission shaft 141 and a worm 146 disposed on the second drive shaft 112 and matched with the turbine 145. The transmission shaft 141 is driven to rotate by using the turbine and the worm. This achieves a simple structure, and relatively stable transmission of the turbine and the worm.

Figure 14:
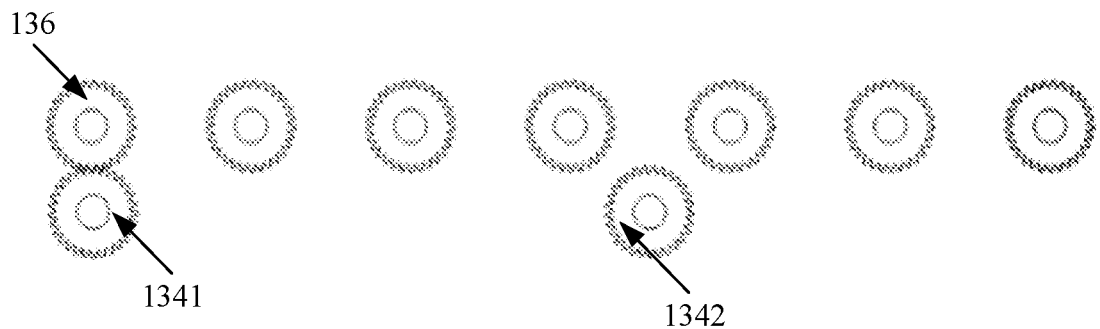
FIG. 14 is a schematic diagram of a meshing state of a first shift wheel, a second shift wheel, and a driven wheel according to an embodiment of this application.
Figure 15:
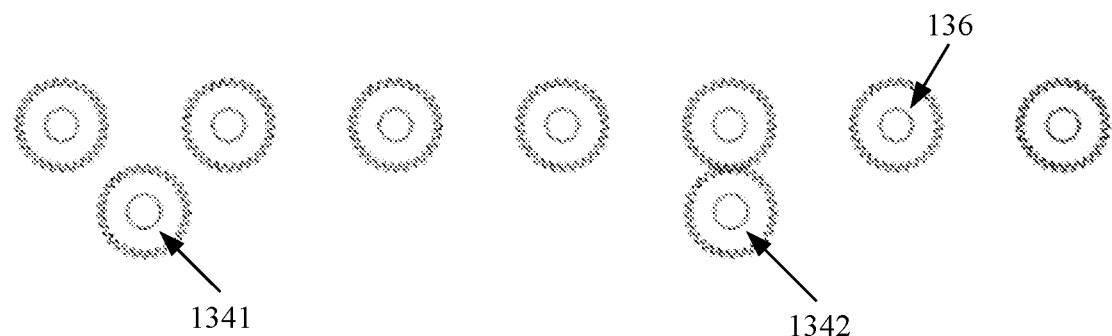
FIG. 15 is a schematic diagram of a meshing state of a first shift wheel, a second shift wheel, and a driven wheel according to an embodiment of this application.

When the adjustment rod 12 in the first adjustment rod group 121 or the adjustment rod 12 in the second adjustment rod group 122 is selectively connected, any adjustment rod 12 in the first adjustment rod group 121 or the second adjustment rod group 122 needs to be connected. To reduce a size of the moving frame 131 along the first direction and ensure that any adjustment rod 12 can be connected, as shown in FIG. 4, the moving frame 131 is slidably disposed between adjustment rods 12 at both ends of the first adjustment rod group 121 or slidably disposed between adjustment rods 12 at both ends of the second adjustment rod group 122 (as shown in FIG. 4, the adjustment rods 12 at both ends of the first adjustment rod group 121 are an adjustment rod A1 and an adjustment rod A2, and the adjustment rods 12 at both ends of the second adjustment rod group 122 are an adjustment rod B1 and an adjustment rod B2). As shown in FIG. 6, the shift shaft includes a first shift shaft 1331 and a second shift shaft 1332 that are disposed at both ends of the moving frame, and the shift wheel 134 includes a first shift wheel 1341 disposed on the first shift shaft 1331 and a second shift wheel 1342 disposed on the second shift shaft 1332. As shown in FIG. 14 and FIG. 15, in a process in which the moving frame moves along the first direction, when one of the first shift wheel 1341 and the second shift wheel 1342 is meshed with a corresponding driven wheel 136, the other is located between two corresponding driven wheels 136.

With reference to FIG. 14 and FIG. 15, for example, if there are seven driven wheels 136 on the first adjustment rod group 121, which are a first driven wheel, a second driven wheel, a third driven wheel, a fourth driven wheel, a fifth driven wheel, a sixth driven wheel, and a seventh driven wheel from left to right, and a distance between every two adjacent driven wheels is a, a distance between an axle center of the first driven wheel and an axle center of the seventh driven wheel is 6a, there are the first shift wheel 1341 and the second shift wheel 1342 from left to right, and a distance between an axle center of the first shift wheel 1341 and an axle center of the second shift wheel 1342 is 3.5a. When the axle center of the first shift wheel 1341 is aligned with the axle center of the first driven wheel, the axle center of the second shift wheel 1342 is located between an axle center of the fourth driven wheel and an axle center of the fifth driven wheel. If the axle center of the second shift wheel 1342 needs to be aligned with the axle center of the fifth driven wheel, the moving frame moves to the right by a/2. In this case, the axle center of the second shift wheel 1342 is aligned with the axle center of the fifth driven wheel, and the axle center of the first shift wheel 1341 is located between the axle center of the first driven wheel and the axle center of the second driven wheel. A technical effect achieved in this design is as follows: A length size of the moving frame is only 3.5a, so that selective meshing of all the driven wheels on the first adjustment rod group can be ensured. If only one shift wheel is used, the length size of the moving frame is at least 6a. Therefore, the technical solution used in this application can significantly reduce a size of the moving frame, to further reduce a size of the entire adjustment apparatus along the first direction, and coincides with a technical effect achieved by setting the first adjustment rod group and the second adjustment rod group. It should be noted that, the foregoing is described only by using the specific embodiments in FIG. 14 and FIG. 15, and it is not determined that the distance between the two adjacent driven wheels is a, the distance between the axle center of the first driven wheel and the axle center of the seventh driven wheel is 6a, and the distance between the axle center of the first shift wheel 1341 and the axle center of the second shift wheel 1342 is 3.5a.

Figure 11:
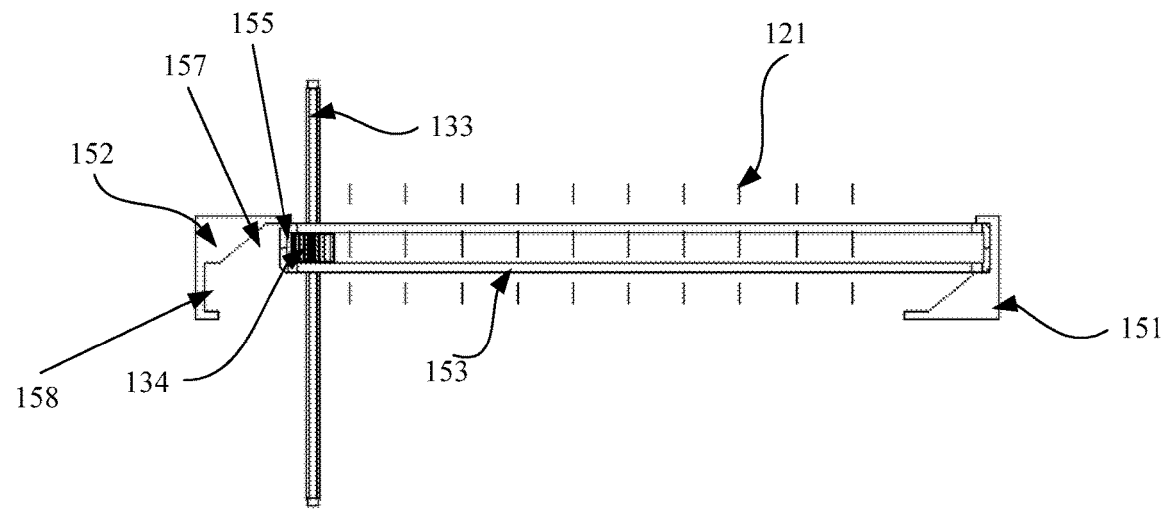
FIG. 11 is a schematic diagram of a connection relationship between a first shift conversion box, a second shift conversion box, a bracket, a shift shaft, and a shift wheel according to an embodiment of this application.

In some implementations, as shown in FIG. 10 and FIG. 11, the shift unit 15 includes a first shift conversion box 151 and a second shift conversion box 152 that are disposed oppositely. The first shift conversion box 151 and the second shift conversion box 152 are disposed oppositely at both ends of the first adjustment rod group 121 and both ends of the second adjustment rod group 122, a bracket 153 is movably disposed between the first shift conversion box 151 and the second shift conversion box 152, the shift wheel 134 is disposed on the bracket 153, the shift shaft 133 passes through the bracket 153 and can slide along an extension direction of the bracket 153 synchronously with the shift wheel 134, a first abutment surface 154 and a second abutment surface 155 that abut the shift wheel 134 are formed at both ends of the bracket 153, the first abutment surface 154 is close to the first shift conversion box 151, the second abutment surface 155 is close to the second shift conversion box 152, an up slide 156 is disposed on the first shift conversion box 151, and a down slide 157 is disposed on the second shift conversion box 152. When the shift wheel 134 abuts the first abutment surface 154, the moving shift shaft 133 and the shift wheel 134 drive the bracket 153 to move along the up slide 156, so that the shift wheel 134 and the bracket 153 move to the first adjustment rod group 121, and when the shift wheel 134 abuts the second abutment surface 155, the moving shift shaft 133 and the shift wheel 134 drive the bracket 153 to move along the down slide 157, so that the shift wheel 134 and the bracket 153 move to the second adjustment rod group 122.

That is, by using the up slide 156 disposed on the first shift conversion box 151 and the down slide 157 disposed on the second shift conversion box 152, the shift wheel 134 is switched between the first adjustment rod group 121 and the second adjustment rod group 122. In addition, in embodiments, switching movement of the shift wheel 134 between the first adjustment rod group 121 and the second adjustment rod group 122 is movement performed by using the shift shaft 133 and the shift wheel 134 along the first direction, and a push force is applied to the bracket 153, so that the bracket 153 and the shift wheel 134 are switched between the first adjustment rod group 121 and the second adjustment rod group 122, thereby ensuring selective meshing with the driven wheel on the first adjustment rod group 121 and the driven wheel on the second adjustment rod group 122, without setting an independent push structure for driving the bracket 153 and the shift wheel 134 to move. In this way, the structure of the entire adjustment apparatus is effectively simplified.

When the shift wheel includes the first shift wheel and the second shift wheel, the first shift wheel is closer to the first shift conversion box relative to the second shift wheel, and the second shift wheel is closer to the second shift conversion box relative to the first shift wheel. In this case, when the first shift wheel abuts the first abutment surface, the moving shift shaft and the first shift wheel drive the bracket to move along the up slide, so that the first shift wheel, the second shift wheel, and the bracket move to the first adjustment rod group. When the second shift wheel abuts the second abutment surface, the moving shift shaft and the second shift wheel drive the bracket to move along the down slide, so that the second shift wheel, the first shift wheel, and the bracket move to the second adjustment rod group.

In some implementations, the first adjustment rod group 121 and the second adjustment rod group 122 may be disposed facing each other along an up-down direction. In some other implementations, as shown in FIG. 4, the first adjustment rod group 121 and the second adjustment rod group 122 are not disposed facing each other along an up-down direction. In this application, the first adjustment rod group 121 and the second adjustment rod group 122 are preferably not disposed facing each other along an up-down direction. In this way, when the first adjustment rod group 121 and the second adjustment rod group 122 are disposed facing each other along an up-down direction, the shift wheel is disposed between the first adjustment rod group 121 and the second adjustment rod group 122. Therefore, to ensure that the shift wheel is not meshed with the driven wheel on the second adjustment rod group 122 when the shift wheel is meshed with the driven wheel on the first adjustment rod group 121, and there is a spacing b between the shift wheel and the driven wheel on the second adjustment rod group 122 when the shift wheel is meshed with the driven wheel on the first adjustment rod group 121. In this case, a distance between the driven wheel on the first adjustment rod group 121 and the driven wheel on the second adjustment rod group 122 is equal to a sum of a radius of the driven wheel on the first adjustment rod group 121, a radius of the driven wheel on the second adjustment rod group 122, and the spacing b. However, when the first adjustment rod group 121 and the second adjustment rod group 122 are not disposed facing each other along an up-down direction, a distance between the driven wheel on the first adjustment rod group 121 and the driven wheel on the second adjustment rod group 122 is equal to a sum of a radius of the driven wheel on the first adjustment rod group 121 and a radius of the driven wheel on the second adjustment rod group 122. Therefore, the first adjustment rod group 121 and the second adjustment rod group 122 may not be disposed facing each other along an up-down direction, so that a size of the entire adjustment apparatus along an up-down direction can be reduced.

Figure 16:
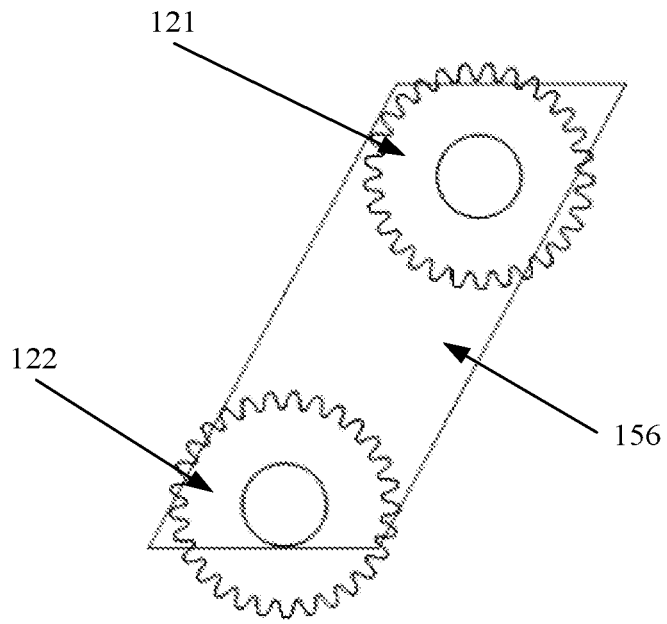
FIG. 16 is a schematic diagram of a structure of an up side according to an embodiment of this application.
Figure 17:
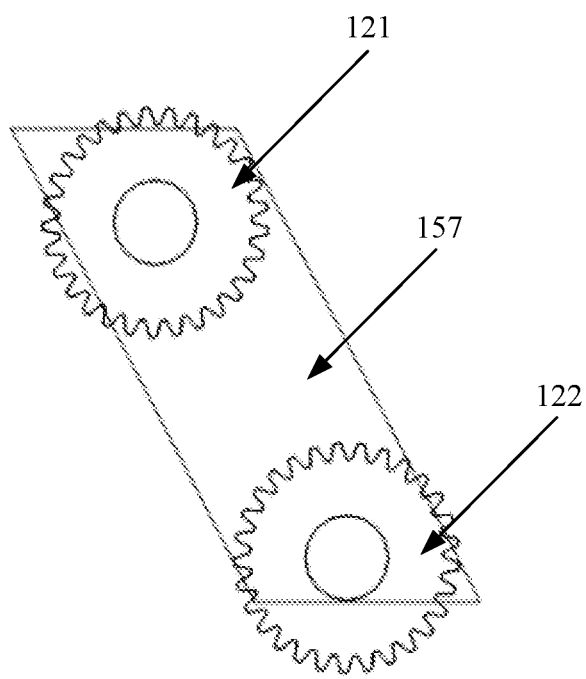
FIG. 17 is a schematic diagram of a structure of a down side according to an embodiment of this application.

For example, the moving frame 131 is disposed on a side of the first adjustment rod group 121 and the second adjustment rod group 122 that are arranged along an up-down direction, and the first adjustment rod group 121 is closer to the moving frame 131 relative to the second adjustment rod group 122. As shown in FIG. 16 and FIG. 17, both the up slide 156 and the down slide 157 are inclined slides, and one end of the inclined slide faces the first adjustment rod group 121 and the other end faces the second adjustment rod group 122. Because both the up slide 156 and the down slide 157 are inclined slides, the shift wheel and the bracket are slidably disposed on the shift shaft. In this way, it can be ensured that a shift wheel after shifting is connected to a corresponding driven wheel on the first adjustment rod group and the second adjustment rod group.

In some implementations, the shift shaft is connected to the shift wheel by using a spline structure, that is, an external spline is disposed on the shift shaft, and an internal spline matched with the outer spline is disposed on the shift wheel. In this way, when the bracket slides along the inclined slide, the shift wheel can slide along the shift shaft.

A sliding groove for the shift shaft 133 to slide along the first direction is disposed on the bracket 153.

As shown in FIG. 10 and FIG. 11, first support grooves 158 for supporting the bracket 153 are oppositely disposed on the first shift conversion box 151 and the second shift conversion box 152, and the up slide 156 communicates with the first support groove 158 of the first shift conversion box 151. Second support grooves 159 for supporting the bracket 153 are oppositely disposed on the first shift conversion box 151 and the second shift conversion box 152, and the down slide 157 communicates with the second support groove 159 of the second gear shift conversion box 152. Specific structures of the first support groove 158 and the second support groove 159 are not limited herein, and any structure falls within the protection scope of this application.

To reduce a size of the entire adjustment apparatus along a direction consistent with the axial direction of the adjustment rod, as shown in FIG. 4 and FIG. 6, the drive unit 11 is disposed above or below the moving frame 131, the drive unit 11 has a first output shaft 113, a second output shaft 114, a first drive shaft 111 arranged up and down with the first output shaft 113, and a second drive shaft 112 arranged up and down with the second output shaft 114, the first drive shaft 111 is connected to the selection unit 13, the second drive shaft 112 is connected to the adjustment unit 14, a first driving wheel 115 is disposed on the first output shaft 113, a first driven wheel 116 meshed with the first driving wheel 115 is disposed on the first drive shaft 111, a second driving wheel 117 is disposed on the second output shaft 114, and a second driven wheel 118 meshed with the second driving wheel 117 is disposed on the second drive shaft 112. The drive unit is disposed above or below the moving frame, instead of being disposed along a direction consistent with the axial direction of the adjustment rod. In this way, space above or below the moving frame is fully utilized, so that a layout of the entire adjustment apparatus is more proper.

As shown in FIG. 4 and FIG. 5, the support rod includes a first support rod and a second support rod, and both ends of the shift shaft are correspondingly slidably disposed on the first support rod and the second support rod. In this way, sliding stability of the shift shaft can be improved, and working stability of the entire adjustment apparatus can be further ensured.

With reference to FIG. 4, FIG. 8, FIG. 10, and FIG. 11, a working process of the adjustment apparatus provided in embodiments of this application is described in detail: If the load correspondingly connected to the adjustment rod 12 in the first adjustment rod group 121 needs to be adjusted, the first drive shaft 111 rotates to drive the moving frame 131 to move along the first direction X, to drive the shift shaft 133 and the shift wheel 134, and the primary bevel gear 142 disposed on the transmission shaft 141 to move. When the shift shaft 133, the shift wheel 134, and the primary bevel gear 142 move to the adjustment rod that corresponds to the load and that needs to be adjusted, the first drive shaft 111 stops rotating, and the second drive shaft 112 rotates, to drive the transmission shaft 141 to rotate. The rotating transmission shaft 141 drives the primary bevel gear 142 to rotate synchronously, and the primary bevel gear 142 drives the secondary bevel gear 143 to rotate, to drive the shift shaft 133 and the shift wheel 134 to rotate. The shift wheel 134 drives the driven wheel 136 meshed with the shift wheel 134 to rotate. When the adjustment rod 12 is threadedly connected to the driven wheel 136, the rotating driven wheel 136 drives the adjustment rod 12 to move linearly along an axial direction of the driven wheel 136, and finally drives the load to move linearly. If the load corresponding to the adjustment rod 12 in the second adjustment rod group 122 needs to be adjusted, the shift shaft 133 and the shift shaft 134 move to an end of the bracket 153 near the down slide 157, and the moving shift shaft 133 and the shift wheel 134 drive the bracket 153 to slide along the down slide 157. A specific process of adjusting the load correspondingly connected to the second adjustment rod group 122 is the same as the foregoing process of adjusting the load correspondingly connected to the first adjustment rod group 121.

According to another aspect, an embodiment of this application further provides a multi-band antenna. As shown in FIG. 2, the multi-band antenna includes an antenna array 2, a phase shifter 3, and the adjustment apparatus 1 provided in the foregoing embodiment. The antenna array 2 is configured to radiate an electromagnetic wave in a plurality of bands, the phase shifter 3 is connected to the antenna array 2, and is configured to adjust a phase of the electromagnetic wave of the antenna array 2, and there are a plurality of phase shifters 3. The plurality of adjustment rods 12 of the adjustment apparatus 1 are correspondingly connected to a plurality of phase shifters 3 one by one, that is, one adjustment rod 12 is connected to one phase shifter 3.

The multi-band antenna provided in embodiments of this application includes the adjustment apparatus provided in the foregoing embodiment, and the adjustment apparatus is used to adjust the phase shifter 3 to move linearly along a direction consistent with the axial direction of the adjustment rod 12, to adjust an electric downtilt angle of the antenna. Because the plurality of adjustment rods that are in the adjustment apparatus and that are correspondingly connected to the plurality of phase shifters are classified into the first adjustment rod group and the second adjustment rod group that are disposed along the up-down direction, a size of the entire antenna along the first direction (which is usually a width size of the antenna) can be effectively reduced, thereby avoiding a phenomenon that the antenna is greatly affected due to a relatively large wind resistance caused by a relatively large size of the antenna along the first direction, and ensuring a balance between a size (which is usually a thickness size) of the antenna along the first direction and a size of the antenna along the up-down direction. Because the first adjustment rod group and the second adjustment rod group are arranged along the up-down direction, the shift unit may be used to enable the selection unit to be switched between the first adjustment rod group and the second adjustment rod group, so as to ensure that the selection unit can select all the adjustment rods, thereby ensuring that phase adjustment can be performed on all the phase shifters. The adjustment apparatus in the antenna provided in embodiments of this application can fully and properly utilize available space inside the antenna, so that the antenna meets a miniaturization design requirement.

According to another aspect, an embodiment of this application further provides a base station. The base station includes a transceiver and the multi-band antenna provided in the foregoing embodiment, and the transceiver is configured to receive a signal transmitted by the multi-band antenna.

Because the base station includes the multi-band antenna provided in the foregoing embodiment, a technical problem resolved by the base station is the same as the technical problem resolved by the multi-band antenna, and a technical effect achieved by the base station is also the same as the technical effect achieved by the multi-band antenna.

In the descriptions of this specification, the described specific features, structures, materials, or characteristics may be combined in a proper manner in any one or more of the embodiments or examples.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An adjustment apparatus, comprising:
   a drive unit;
   a plurality of adjustment rods, configured to be correspondingly connected to a plurality of loads one by one, wherein the plurality of adjustment rods are classified into a first adjustment rod group and a second adjustment rod group that are arranged along an up-down direction,
      wherein the first adjustment rod group and the second adjustment rod group each comprise a plurality of adjustment rods that are arranged in parallel and at intervals along a first direction, and the first direction is perpendicular to the up-and-down direction;
   a selection unit, wherein the selection unit is connected to the drive unit, and the drive unit is configured to drive the selection unit to be connected to at least one adjustment rod in the first adjustment rod group or at least one adjustment rod in the second adjustment rod group;
   a shift unit, configured to enable the selection unit to be switched between the first adjustment rod group and the second adjustment rod group; and
   an adjustment unit, wherein the adjustment unit is connected to the drive unit, and the drive unit is configured to drive the adjustment unit to drive the at least one adjustment rod connected to the selection unit to move, to drive a corresponding load to move along a direction consistent with an axial direction of the at least one adjustment rod.

2. The adjustment apparatus according to claim 1, wherein the selection unit comprises:
   a moving frame, wherein the moving frame is slidably disposed on a support rod, the drive unit is connected to the moving frame by using a first transmission unit, to drive the moving frame to slide along the support rod, and a sliding direction of the moving frame is parallel to the first direction;
   a shift shaft, which moves synchronously with the moving frame and is disposed on the moving frame,
      wherein an axial direction of the shift shaft is consistent with the axial direction of the at least one adjustment rod, the shift shaft is located between the first adjustment rod group and the second adjustment rod group, a shift wheel is disposed on the shift shaft, wherein a driven wheel matched with the shift wheel is disposed on the adjustment rod, the driven wheel is disposed on a limit frame, the limit frame is configured to prevent the driven wheel from moving along the axial direction of the at least one adjustment rod, the shift shaft is connected to the adjustment unit that can drive the shift shaft to rotate, and the shift shaft is switched between the first adjustment rod group and the second adjustment rod group by using the shift unit; and wherein the at least one adjustment rod is threadedly connected to the driven wheel; or the at least one adjustment rod is fixedly connected to the driven wheel, the at least one adjustment rod is connected to the corresponding load by using a conversion structure, and the conversion structure is configured to convert rotational movement of the at least one adjustment rod into movement of the corresponding load along a direction consistent with the axial direction of the at least one adjustment rod.

3. The adjustment apparatus according to claim 2, wherein the conversion structure comprises:
a first bevel gear, disposed on the at least one adjustment rod; and
a second bevel gear, wherein the second bevel gear is meshed with the first bevel gear, and is connected to a spur gear by using a connecting shaft,
wherein a rack matched with the spur gear is disposed on the load, and an extension direction of the rack is consistent with the axial direction of the at least one adjustment rod.

4. The adjustment apparatus according to claim 2, wherein the drive unit comprises a first drive shaft, the first transmission unit comprises transmission teeth disposed on the first drive shaft, meshing teeth matched with the transmission teeth are disposed on the moving frame, and an arrangement direction of the meshing teeth is parallel to the first direction.

5. The adjustment apparatus according to claim 2, wherein the limit frame comprises a first limit plate and a second limit plate that are disposed oppositely, the driven wheel is disposed between the first limit plate and the second limit plate, and the at least one adjustment rod sequentially passes through the first limit plate, the driven wheel, and the second limit plate along an axial direction of the driven wheel.

6. The adjustment apparatus according to claim 2, wherein the adjustment unit comprises:
a transmission shaft, wherein an axial direction of the transmission shaft is parallel to the first direction, the drive unit is connected to the transmission shaft by using a second transmission unit, to drive the transmission shaft to rotate, the transmission shaft is connected to the shift shaft by using a linkage structure, and the linkage structure is configured to enable the transmission shaft to drive the shift shaft to rotate synchronously.

7. The adjustment apparatus according to claim 6, wherein the linkage structure comprises:
a primary bevel gear, wherein the primary bevel gear is disposed on the transmission shaft; and
a secondary bevel gear, wherein the secondary bevel gear is disposed on the shift shaft and meshed with the primary bevel gear, the primary bevel gear is connected to the shift shaft by using a connecting part, and when the shift shaft moves along the first direction, the primary bevel gear is driven to move along the transmission shaft by using the connecting part.

8. The adjustment apparatus according to claim 7, wherein the connecting part comprises a first connecting plate slidably disposed on the transmission shaft, a second connecting plate connected to the first connecting plate is disposed on the shift shaft, the primary bevel gear is rotatably connected to the first connecting plate, and the secondary bevel gear is rotatably connected to the second connecting plate.

9. The adjustment apparatus according to claim 6, wherein the drive unit comprises a second drive shaft, and the second transmission unit comprises a turbine disposed on the transmission shaft and a worm disposed on the second drive shaft and matched with the turbine.

10. The adjustment apparatus according to claim 2, wherein the moving frame is slidably disposed between adjustment rods at both ends of the first adjustment rod group or slidably disposed between adjustment rods at both ends of the second adjustment rod group, the shift shaft comprises a first shift shaft and a second shift shaft that are disposed at both ends of the moving frame, the shift wheel comprises a first shift wheel disposed on the first shift shaft and a second shift wheel disposed on the second shift shaft, and in a process in which the moving frame moves along the first direction, when one of the first shift wheel and the second shift wheel is meshed with a corresponding driven wheel, the other is located between two corresponding driven wheels.

11. The adjustment apparatus according to claim 2, wherein the shift unit comprises:
a first shift conversion box and a second shift conversion box that are disposed oppositely, wherein the first shift conversion box and the second shift conversion box are disposed oppositely at both ends of the first adjustment rod group and both ends of the second adjustment rod group, a bracket is movably disposed between the first shift conversion box and the second shift conversion box, the shift wheel is disposed on the bracket, the shift shaft passes through the bracket and can slide along an extension direction of the bracket synchronously with the shift wheel, a first abutment surface and a second abutment surface that abut the shift wheel are formed at both ends of the bracket, the first abutment surface is close to the first shift conversion box, the second abutment surface is close to the second shift conversion box, and an up slide is disposed on the first shift conversion box, and a down slide is disposed on the second shift conversion box; and
when the shift wheel abuts the first abutment surface, the moving shift shaft and the shift wheel drive the bracket to move along the up slide, so that the shift wheel and the bracket move to the first adjustment rod group, and when the shift wheel abuts the second abutment surface, the moving shift shaft and the shift wheel drive the bracket to move along the down slide, so that the shift wheel and the bracket move to the second adjustment rod group.

12. The adjustment apparatus according to claim 11, wherein the moving frame is disposed on a side of the first adjustment rod group and the second adjustment rod group that are arranged along an up-down direction, the first adjustment rod group is closer to the moving frame relative to the second adjustment rod group, both the up slide and the down slide are inclined slides, one end of the inclined slide faces the first adjustment rod group and the other end faces the second adjustment rod group, and the shift wheel and the bracket are slidably disposed on the shift shaft.

13. The adjustment apparatus according to claim 12, wherein the shift shaft is connected to the shift wheel by using a spline structure, an external spline is disposed on the shift shaft, and an internal spline matched with the outer spline is disposed on the shift wheel.

14. The adjustment apparatus according to claim 11, wherein first support grooves for supporting the bracket are oppositely disposed on the first shift conversion box and the second shift conversion box, and the up slide communicates with the first support groove of the first shift conversion box; and second support grooves for supporting the bracket are oppositely disposed on the first shift conversion box and the second shift conversion box, and the down slide communicates with the second support groove of the second gear shift conversion box.

15. The adjustment apparatus according to claim 2, wherein the drive unit is disposed above or below the moving frame, the drive unit has a first output shaft, a second output shaft, a first drive shaft arranged up and down with the first output shaft, and a second drive shaft arranged up and down with the second output shaft, the first drive shaft is connected to the selection unit, the second drive shaft is connected to the adjustment unit, a first driving wheel is disposed on the first output shaft, a first driven wheel meshed with the first driving wheel is disposed on the first drive shaft, a second driving wheel is disposed on the second output shaft, and a second driven wheel meshed with the second driving wheel is disposed on the second drive shaft.

16. A multi-band antenna comprising:
an antenna array, configured to radiate an electromagnetic wave in a plurality of bands;
a plurality of phase shifters, each of which is connected to the antenna array, and configured to adjust a phase of the electromagnetic wave of the antenna array; and
an adjustment apparatus, comprising:
a drive unit;
a plurality of adjustment rods, configured to be correspondingly connected to the plurality of phase shifters one by one,
wherein the plurality of adjustment rods are classified into a first adjustment rod group and a second adjustment rod group that are arranged along an up-down direction,
wherein the first adjustment rod group and the second adjustment rod group each comprise a plurality of adjustment rods that are arranged in parallel and at intervals along a first direction, and the first direction is perpendicular to the up-and-down direction;
a selection unit, wherein the selection unit is connected to the drive unit, and the drive unit is configured to drive the selection unit to be connected to at least one adjustment rod in the first adjustment rod group or at least one adjustment rod in the second adjustment rod group;
a shift unit, configured to enable the selection unit to be switched between the first adjustment rod group and the second adjustment rod group; and
an adjustment unit, wherein the adjustment unit is connected to the drive unit, and the drive unit is configured to drive the adjustment unit to drive the at least one adjustment rod connected to the selection unit to move, to drive a corresponding phase shifter to move along a direction consistent with an axial direction of the at least one adjustment rod.

17. A base station comprising:
a transceiver, configured to receive and transmit a signal transmitted by a multi-band antenna; and
the multi-band antenna comprising:
an antenna array, configured to radiate an electromagnetic wave in a plurality of bands;
a plurality of phase shifters, each of which is connected to the antenna array, and configured to adjust a phase of the electromagnetic wave of the antenna array; and
an adjustment apparatus, comprising:
a drive unit;
a plurality of adjustment rods, configured to be correspondingly connected to the plurality of phase shifters one by one,
wherein the plurality of adjustment rods are classified into a first adjustment rod group and a second adjustment rod group that are arranged along an up-down direction,
wherein the first adjustment rod group and the second adjustment rod group each comprise a plurality of adjustment rods that are arranged in parallel and at intervals along a first direction, and the first direction is perpendicular to the up-and-down direction;
a selection unit, wherein the selection unit is connected to the drive unit, and the drive unit is configured to drive the selection unit to be connected to at least one adjustment rod in the first adjustment rod group or at least one adjustment rod in the second adjustment rod group;
a shift unit, configured to enable the selection unit to be switched between the first adjustment rod group and the second adjustment rod group; and
an adjustment unit, wherein the adjustment unit is connected to the drive unit, and the drive unit is configured to drive the adjustment unit to drive the at least one adjustment rod connected to the selection unit to move, to drive a corresponding phase shifter to move along a direction consistent with an axial direction of the at least one adjustment rod.

18. The multi-band antenna according to claim 16, wherein the selection unit comprises:
a moving frame, wherein the moving frame is slidably disposed on a support rod, the drive unit is connected to the moving frame by using a first transmission unit, to drive the moving frame to slide along the support rod, and a sliding direction of the moving frame is parallel to the first direction;
a shift shaft, which moves synchronously with the moving frame and is disposed on the moving frame,
wherein an axial direction of the shift shaft is consistent with the axial direction of the at least one adjustment rod, the shift shaft is located between the first adjustment rod group and the second adjustment rod group, a shift wheel is disposed on the shift shaft,
wherein a driven wheel matched with the shift wheel is disposed on the adjustment rod, the driven wheel is disposed on a limit frame, the limit frame is configured to prevent the driven wheel from moving along the axial direction of the at least one adjustment rod, the shift shaft is connected to the adjustment unit that can drive the shift shaft to rotate, and the shift shaft is switched between the first adjustment rod group and the second adjustment rod group by using the shift unit; and wherein the at least one adjustment rod is threadedly connected to the driven wheel; or the at least one adjustment rod is fixedly connected to the driven wheel, the at least one adjustment rod is connected to the corresponding load by using a conversion structure, and the conversion structure is configured to convert rotational movement of the at least one adjustment rod into movement of the corresponding load along a direction consistent with the axial direction of the at least one adjustment rod.

19. The multi-band antenna according to claim 18, wherein the conversion structure comprises:

a first bevel gear, disposed on the at least one adjustment rod; and a second bevel gear, wherein the second bevel gear is meshed with the first bevel gear, and is connected to a spur gear by using a connecting shaft, wherein a rack matched with the spur gear is disposed on the load, and an extension direction of the rack is consistent with the axial direction of the at least one adjustment rod.

20. The base station according to claim 17, wherein the selection unit comprises:

a moving frame, wherein the moving frame is slidably disposed on a support rod, the drive unit is connected to the moving frame by using a first transmission unit, to drive the moving frame to slide along the support rod, and a sliding direction of the moving frame is parallel to the first direction;

a shift shaft, which moves synchronously with the moving frame and is disposed on the moving frame, wherein an axial direction of the shift shaft is consistent with the axial direction of the at least one adjustment rod, the shift shaft is located between the first adjustment rod group and the second adjustment rod group, a shift wheel is disposed on the shift shaft, wherein a driven wheel matched with the shift wheel is disposed on the adjustment rod, the driven wheel is disposed on a limit frame, the limit frame is configured to prevent the driven wheel from moving along the axial direction of the at least one adjustment rod, the shift shaft is connected to the adjustment unit that can drive the shift shaft to rotate, and the shift shaft is switched between the first adjustment rod group and the second adjustment rod group by using the shift unit; and wherein the at least one adjustment rod is threadedly connected to the driven wheel; or the at least one adjustment rod is fixedly connected to the driven wheel, the at least one adjustment rod is connected to the corresponding load by using a conversion structure, and the conversion structure is configured to convert rotational movement of the at least one adjustment rod into movement of the corresponding load along a direction consistent with the axial direction of the at least one adjustment rod.

* * * * *